United States Patent [19]

Weerasooriya et al.

[11] Patent Number: 5,750,749

[45] Date of Patent: May 12, 1998

[54] POLYHYDROXY-FATTY AMIDE SURFACTANT COMPOSITION AND METHOD OF PREPARING SAME

[75] Inventors: Upali Weerasooriya, Austin; John Lin, Cedar Park, both of Tex.

[73] Assignee: CONDEA Vista Company, Houston, Tex.

[21] Appl. No.: 599,300

[22] Filed: Feb. 9, 1996

[51] Int. Cl.$^6$ .................... C07C 231/02; C07C 235/02
[52] U.S. Cl. .................................. 554/69; 554/64
[58] Field of Search .................. 554/69, 64, 66, 554/61, 63, 70

[56] References Cited

U.S. PATENT DOCUMENTS

| | | | |
|---|---|---|---|
| 2,703,798 | 3/1955 | Schwartz | 554/69 |
| 5,250,225 | 10/1993 | Oppenlaender et al. | 252/389.62 |
| 5,298,636 | 3/1994 | Connor et al. | 554/69 |
| 5,380,891 | 1/1995 | Connor, et al. | 554/69 |
| 5,523,431 | 6/1996 | Sköld | 554/70 |
| 5,539,134 | 7/1996 | Strecker et al. | 554/69 |
| 5,571,934 | 11/1996 | Papenfuhs et al. | 554/70 |
| 5,587,498 | 12/1996 | Krogh et al. | 554/69 |

FOREIGN PATENT DOCUMENTS

| | | |
|---|---|---|
| 2127644 | 1/1995 | Canada. |
| WO92/06071 | 4/1992 | WIPO. |
| WO92/06072 | 4/1992 | WIPO. |
| WO92/06073 | 4/1992 | WIPO. |
| WO92/08687 | 5/1992 | WIPO. |
| WO92/03004 | 2/1993 | WIPO. |

OTHER PUBLICATIONS

Boekenoogen H.A., "Analysis & Characterization of Oils, Fats and Fat, Product"–Analysis of Glycerides and Composition of Natural Oils & Fats–p. 222., 1968.

R.G. Bistline, Jr., et al., "Soap–Based Formulations: VI. Alkylaryl Sulfonamide Derivatives as Lime Soap Dispersing Agents," *JAOCS* 51:126 (1974).

R.G. Bistline, Jr., et al., Soap–Based Detergent Formulations: XIV. Amphoteric Derivatives of Alkylbenzenesulfonamides. *JAOCS* 53:64 (1976).

W.W. Schmidt, et al., "A Novel Dianionic Surfactant from the Reaction of $C_{14}$-Alkenylsuccinic Anhydride with Sodium Isethionate," *JAOCS*, 71:695 (1994).

A. Patel, et al., "The Phthalation of 2–amino–2–deoxy–D–glucose and N–methyl–1–amino–1–deoxy–D–glucitol; Conversion of the Products to Organotin Derivatives. A Ready Migration of Acetyl from Oxygen to Nitrogen Under Neutral Conditions," *Recl. Trav. Chim. Pays–Bas* 107:182 (1988).

*Primary Examiner*—Deborah Lambkin
*Attorney, Agent, or Firm*—Browning Bushman

[57] ABSTRACT

A process for preparing a surfactant composition comprising reacting an N-alkylpolyhydroxyamine and an alkoxylated triglyceride of a fatty acid to produce a mixture of a polyhydroxy-fatty amide, an alkoxylated monoglyceride of a fatty acid, and an alkoxylated diglyceride of a fatty acid, the resulting mixture providing a water soluble surfactant composition.

12 Claims, No Drawings

POLYHYDROXY-FATTY AMIDE SURFACTANT COMPOSITION AND METHOD OF PREPARING SAME

BACKGROUND OF THE INVENTION

1. Field of the Invention

The present invention relates to surface-active compositions containing polyhydroxy-fatty amides produced by reacting an N-alkylpolyhydroxyamine with an alkoxylated triglyceride of a fatty acid, and to a method of preparing such compositions.

2. Description of the Prior Art

Polyhydroxy-fatty amides exhibit excellent surface-active properties and are therefore ideally suited for use in cleaning agents, detergents, textile treatment compositions, and the like. Unfortunately, when the alkyl group is of a long chain-- i.e., $C_{12}$ or greater---these amides exhibit poor water solubility at ambient temperatures. To overcome this low water solubility, co-surfactants are typically used to enhance the solubility of the polyhydroxy-fatty amides and utilize their excellent surfactant properties.

U.S. Pat. No. 5,380,891, incorporated herein by reference for all purposes, discloses the reaction of N-monoalkylglucamines with fatty esters to produce surfactant compositions containing glucamides. Canadian Patent Application No. 2,127,644, incorporated herein by reference for all purposes, discloses a continuous process for the preparation of polyhydroxy-fatty amides from N-alkylpolyhydroxyamines and alkyl esters of fatty acids.

Other publications disclosing the preparation of polyhydroxy-fatty amides are described in WO092/06071, WO092/06072, WO092/06073, W)092/08687, and WO093/03004.

SUMMARY OF THE INVENTION

It is therefore an object of the present invention to provide a new surfactant composition containing polyhydroxy-fatty amides.

Another object of the present invention is to provide a surfactant composition containing polyhydroxy-fatty amides and that exhibits good water solubility.

Still a further object of the present invention is to provide a process for making a new surfactant composition containing polyhydroxy-fatty amides.

The above and other objects of the present invention will become apparent from the description given herein and the claims.

According to one aspect of the present invention, there is provided a process for making a surfactant composition wherein an N-alkylpolyhydroxyamine is reacted with an alkoxylated triglyceride of a fatty acid to produce a reaction mixture comprising a polyhydroxy-fatty amide, an alkoxylated monoglyceride of a fatty acid, and an alkoxylated diglyceride of a fatty acid.

In another embodiment of the present invention, there is provided a surfactant composition comprising a polyhydroxy-fatty amide, an alkoxylated monoglyceride of a fatty acid, and an alkoxylated diglyceride of a fatty acid.

DESCRIPTION OF THE PREFERRED EMBODIMENTS

The process of the present invention provides a method of producing a mixture of a polyhydroxy-fatty amide, an alkoxylated monoglyceride of a fatty acid, and an alkoxylated diglyceride of a fatty acid in a single reaction vessel. According to the process, an N-alkylpolyhydroxyamine is reacted with an alkoxylated triglyceride of a fatty acid.

The fatty N-alkylpolyhydroxyamine starting material is characterized by compounds of the formula:

wherein R' is hydrogen, alkyl having from 1 to 6 carbon atoms, preferably 1 to 4 carbon atoms, or hydroxyalkyl having from 1 to 6 carbon atoms, preferably 1 to 4 carbon atoms and Z is a linear polyhydroxyhydrocarbon radical having at least three OH groups, which can also be alkoxylated, preferably a sugar radical. The preferred fatty, N-polyhydroxyamines are those wherein R' has from 1 to 6 carbon atoms, preferably 1 to 4 carbon atoms, and the -Z group has the structure —$CH_2(CHOH)_e$—$CH_2OH$, wherein e is 3 or 4. Thus, preferred N-polyhydroxyamines are the N-alkylglucamines such as those derived from D-glucose, e.g., N-methyl-D-glucamine. Non-limiting examples of such N-alkylglucamines include N-methylglucamine, N-ethylglucamine, N-propylglucamine, etc.

The other starting material, the alkoxylated triglyceride of a fatty acid, will have the general formula:

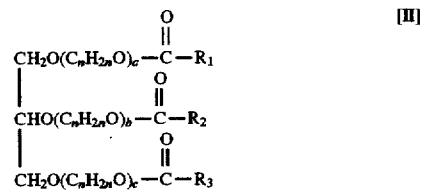

wherein n is from 2 to 4; a, b, and c are the same or different and are integers of from 0 to 300; and $R_1$, $R_2$, and $R_3$ are the same or different and are hydrocarbyl groups having from 4 to 40 carbon atoms, preferably alkyl groups having from 7 to 20 carbon atoms.

The reaction of the N-alkylpolyhydroxyamine and the alkoxylated triglyceride of a fatty acid produces a mixture of a polyhydroxy-fatty amide, an alkoxylated monoglyceride of a fatty acid, an alkoxylated diglyceride of a fatty acid, and—depending upon the amount of triglyceride used, the degree of reaction, etc.—some unreacted triglyceride. The polyhydroxy-fatty amide will have the general formula:

wherein $R_4$ can be any one of $R_1$, $R_2$, or $R_3$. Preferably, the structure of Z will be such that the resulting glucamide has the formula:

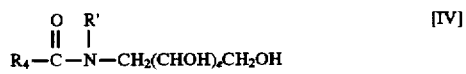

wherein e has the same meaning as above. Compounds having e=4, which are particularly preferred, are termed glucamides and, in the case of glucose, are termed hexose radical glucamides.

A unique feature of the process of the present invention is that by reacting the N-alkylpolyhydroxyamine with the alkoxylated triglyceride of a fatty acid, there is produced in a one-step, single pot reaction a mixture of polyhydroxy-fatty amide surfactant together with alkoxylated monoglyceride of a fatty acid and alkoxylated diglyceride of a fatty acid, the latter two components serving as co-surfactants to enhance the water solubility of the polyhydroxy-fatty amide. Accordingly, in addition to the polyhydroxy-fatty amide produced, there is also produced according to the process of the present invention a mixture of monoglycerides and diglycerides having the general formula:

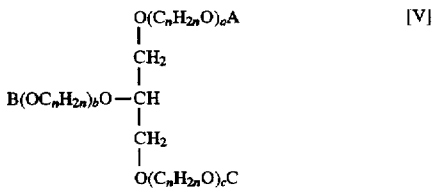

wherein d can be any one of a, b, or c, as defined above, and wherein, in the case of the monoglyceride,

provided that one of A, B, or C must be

and two of A, B, or C must be H; and in the case of the diglyceride, two of A, B, or C must be

and one of A, B, or C must be H.

In conducting the process of the present invention, the N-alkylpolyhydroxyamine and the alkoxylated triglyceride of a fatty acid are reacted in a suitable vessel at a temperature of from about the melting point of the triglyceride used to about 200° C., preferably in the presence of a basic catalyst. Reaction times can vary from 30 minutes to 6 hours, with pressures of from subatmospheric to superatmospheric, depending upon the particular starting materials employed, temperature, type of catalyst, etc. Preferably, the mole ratio of triglyceride to the N-alkylpolyhydroxyamine is about 3:1 or less, generally from about 3:1 to about 1:12.

As noted, the reaction is preferably, but not necessarily, conducted in the presence of a basic catalyst. Suitable, non-limiting examples of basic catalysts include alkali metal alkoxides, alkali metal hydroxides, alkali metal carbonates, trilithium phosphate, trisodium phosphate, tripotassium phosphate, tetrasodium pyrophosphate, tetrapotassium pyrophosphate, pentasodium polyphosphate, pentapotassium tripolyphosphate, disodium tartrate, dipotassium tartrate, sodium potassium tartrate, trisodium citrate, tripotassium citrate, sodium-basic silicates, potassium-basic silicates, sodium-basic aluminosilicates, potassium-basic aluminosilicates, etc. Especially preferred are the carbonates, bicarbonates, and hydroxides of alkali metals. The catalyst will generally be employed in an amount of from about 0.5 mole % or higher, e.g., about 0.5 mole % to about 50 mole % based on the amount of alkoxylated triglyceride. Preferred levels of catalysts are from about 1 mole % to about 20 mole %, even more preferably from about 2 mole % to about 10 mole %.

In a typical mode, the process of the present invention is conducted by introducing the triglyceride and the N-alkylpolyhydroxyamine to a suitable vessel with means for agitation. The mixture, generally a slurry, is heated to the desired temperature, e.g., 150° C, at which point a suitable catalyst, e.g., sodium carbonate, is added to the homogeneous milk. After the desired period of reaction time, e.g., 2 hours, the reaction mixture is allowed to come to ambient temperature.

As noted above, the resulting product is a surfactant composition comprising a mixture of polyhydroxy-fatty amides, an alkoxylated monoglyceride of a fatty acid, and an alkoxylated diglyceride of a fatty acid. Provided the mole ratio of the triglyceride to the N-alkylpolyhydroxyamine is maintained in a ratio of from about 3:1 to about 1:12, the polyhydroxy-fatty amide is produced. Indeed, when the mole ratio of triglycerides to N-alkylpolyhydroxyamine is maintained at about from 1:1 to 1:3, the reaction appears to be quantitative with respect to the N-alkylpolyhydroxyamine. At a ratio of 1:12 (triglyceride:N-alkylpolyhydroxyamine), some unreacted N-alkylpolyhydroxyamine is detected.

To further illustrate the present invention, the following non-limiting examples are presented.

Example 1

Into a 100 ml round-bottom flask equipped with a magnetic stirring bar and a drying tube was added 5 g (1.19 mmol) of trilaurin ethoxylate (84.8 wt. % ethylene oxide) and 232 mg (1.19 mmol) of N-methylglucamine. The slurry was heated to 150° C, at which point 63 mg (0.6 mmol) sodium carbonate was added to the homogeneous melt. After 2 hours of stirring at 150° C, the hazy opaque brown reaction mixture was allowed to cool to ambient temperature. The conversion of the N-methylglucamine was found to be quantitative. Analysis by $^1$H-NMR and $^{13}$C-NMR showed the presence of fatty, N-methylglucamide. This analysis was confirmed by spiking experiments using authentic fatty glucamides and N-methylglucamine.

Example 2

Using the procedure of Example 1, a series of runs were made in which the mole ratio of triglyceride to N-methylglucamine was varied. The resulting product was tested for water solubility in a 3% by weight aqueous solution. NMR analysis ($^1$H and $^{13}$C) was conducted in DMSO-$d_6$ to determine the presence of N-methylglucamine and glucamide. The results are shown in the table below.

| | | NMR in DMSO-$d_6$ | |
|---|---|---|---|
| ETO[1]:NMG[2] Mole Ratio | 3 Wt % Aqueous Solution | NMG Detected | Glucamide Detected |
| 1:12 | Soluble | Yes | Yes |
| 1:3 | Soluble | No | Yes |
| 1:1 | Soluble | No | Yes |
| 3:1 | Soluble | No | No |

[1]Triglyceride
[2]N-methylglucamine

As can be seen from the data in the table, when the mole ratio of triglyceride to N-methylglucamine is about 1:1 to about 1:12, glucamide is clearly detected by NMR spectra. At ratios (triglyceride:N-methylglucamine) of greater than 1:1, i.e., 3:1 or less, it is believed that some glucamide is produced, albeit in quantities too small to detect by NMR analysis. As can also be seen, when the triglyceride to N-methylglucamine ratio is about 1:12, there remains unreacted N-methylglucamine. Significantly, the data show that the glucamide mixture is soluble in a 3 % by weight aqueous solution.

The foregoing description and examples illustrate selected embodiments of the present invention. In light thereof, variations and modifications will be suggested to one skilled in the art, all of which are in the spirit and purview of this invention.

What is claimed is:

1. A process for preparing a surfactant composition comprising:

reacting an N-alkylpolyhydroxyamine and an alkoxylated triglyceride of a fatty acid having the general formula:

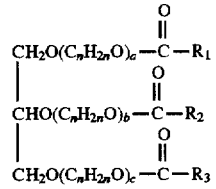

wherein n is 2 to 4; a, b, and c can be the same or different and are integers of from 1 to 300; and $R_1$, $R_2$, and $R_3$ can be the same or different and are hydrocarbyl groups having from 4 to 40 carbon atoms under reaction conditions to produce a mixture of a polyhydroxy- fatty amide, an alkoxylated monoglyceride of a fatty acid, and an alkoxylated diglyceride of a fatty acid under reaction conditions to produce a mixture of a polyhydroxy-fatty amide, an alkoxylated monoglyceride of a fatty acid, and an alkoxylated diglyceride of a fatty acid.

2. The process of claim 1, wherein the mole ratio of said triglyceride to said N-alkylpolyhydroxyamine is about 3:1 to about 1:12.

3. The process of claim 1, wherein said reaction is conducted at a temperature of from about the melting point of said triglyceride to about 200° C.

4. The process of claim 1, wherein said reaction is conducted in the presence of a basic catalyst in an amount of from 0.5 mole % or higher based on said triglyceride.

5. The process of claim 1 wherein said N-alkylpolyhydroxyamine has the general formula:

   [I]

wherein R' is hydrogen, an alkyl group having 1 to 6 carbon atoms, or a hydroxyalkyl group having 1 to 6 carbon atoms, and Z is a linear polyhydroxyhydrocarbon radical having at least three OH groups.

6. The process of claim 1 wherein n is 2; a, b, and c are from 1 to 300; and $R_1$, $R_2$, and $R_3$ are alkyl groups having from 7 to 20 carbon atoms.

7. A surfactant composition derived from reacting an alkoxylated triglyceride of a fatty acid having the general formula:

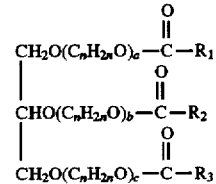

wherein n is 2 to 4; a, b, and c can be the same or different and are integers of from 1 to 300; and $R_1$, $R_2$, and $R_3$ can be the same or different and are hydrocarbyl groups having from 4 to 40 carbon atoms and an N-alkyl-polyhydroxyamine to produce a reaction product comprising a mixture of a polyhydroxy-fatty amide, an alkoxylated monoglyceride of a fatty acid, and an alkoxylated diglyceride of a fatty acid wherein said glycerides have the general formula:

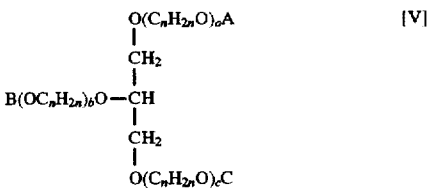   [V]

wherein d can be any one of a, b, or c, as defined above, and wherein, in the case of the monoglyceride,

provided that one of A, B, or C must be

and two of A, B, or C must be H; and in the case of the diglyceride, two of A, B, or C must be

and one of A, B, or C must be H.

8. The surfactant composition of claim 7 wherein the amount of said monoglyceride and diglyceride in said surfactant composition is sufficient to impart water solubility to said surfactant composition.

9. The surfactant composition of claim 7 wherein said polyhydroxy-fatty amide is present in an amount of from about 1 to about 60% by weight.

10. The surfactant composition of claim 7 wherein n is 2; a, b, and c are from 0 to 300; and $R_1$, $R_2$, and $R_3$ are alkyl groups having from 7 to 20 carbon atoms.

11. A surfactant composition produced according to the method of any of claims 1 and 2–5.

12. The process of claim 1 wherein said reaction is conducted in a one-step, single reaction vessel manner.

* * * * *

UNITED STATES PATENT AND TRADEMARK OFFICE
CERTIFICATE OF CORRECTION

PATENT NO. : 5,750,749
DATED : May 12, 1998
INVENTOR(S) : Upali Weerasooriya; John Lin It is certified that error appears in the above-indentified patent and that said Letters Patent is hereby corrected as shown below:

In col. 6, line 20, insert --A is H or-- before "O
$$\underset{R_4-C-,}{\overset{\|}{\phantom{O}}}$$ "

In col. 6, line 25, insert --B is H or-- before "O
$$\underset{R_4-C-,}{\overset{\|}{\phantom{O}}}$$ "

In col. 6, line 25, insert --C is H or-- before "O
$$\underset{R_4-C-,}{\overset{\|}{\phantom{O}}}$$ "

Signed and Sealed this

Twenty-eighth Day of July, 1998

Attest:

BRUCE LEHMAN

*Attesting Officer*  *Commissioner of Patents and Trademarks*